Sept. 1, 1953            H. A. QUIST            2,650,499
SAMPLING ADAPTER FOR RECEPTACLES
Filed March 27, 1950            2 Sheets-Sheet 1
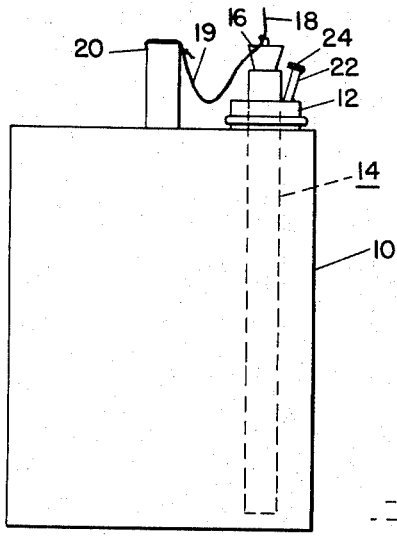
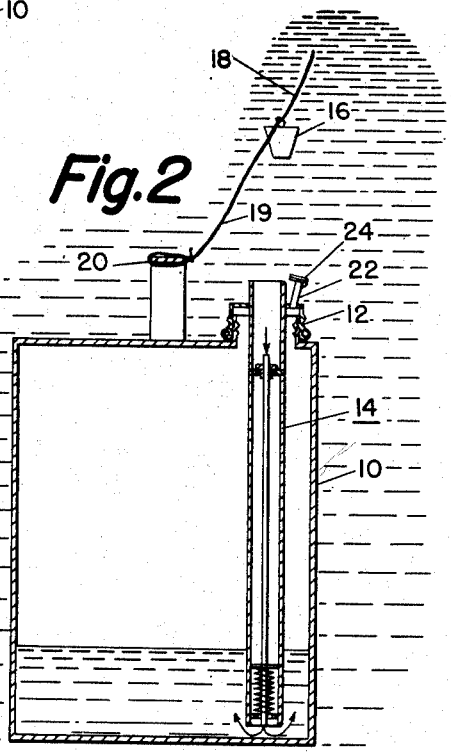
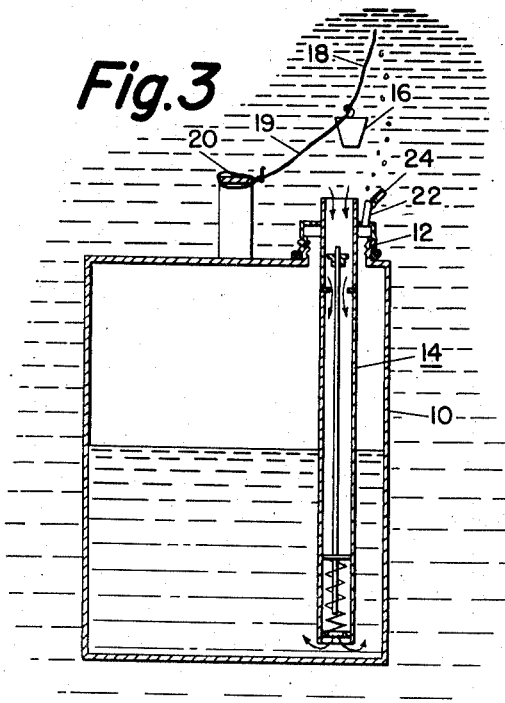
*INVENTOR.*
HAROLD A. QUIST
BY
*Busser and Harding*
ATTORNEYS Sept. 1, 1953 H. A. QUIST 2,650,499
SAMPLING ADAPTER FOR RECEPTACLES
Filed March 27, 1950 2 Sheets-Sheet 2
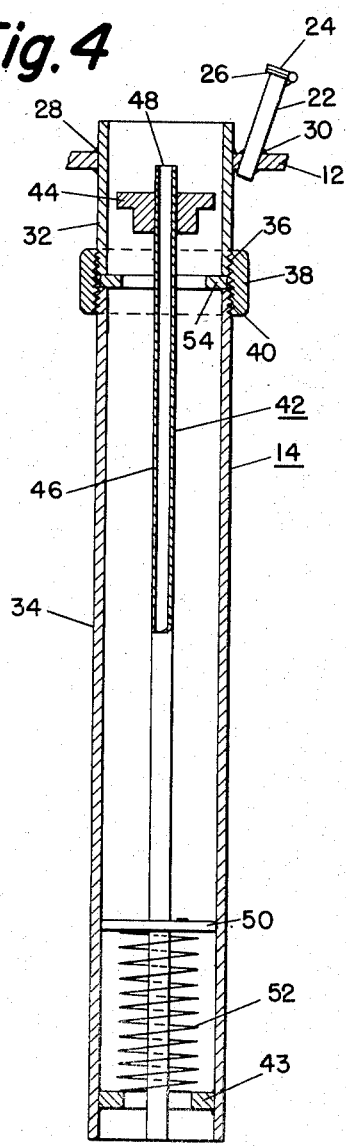
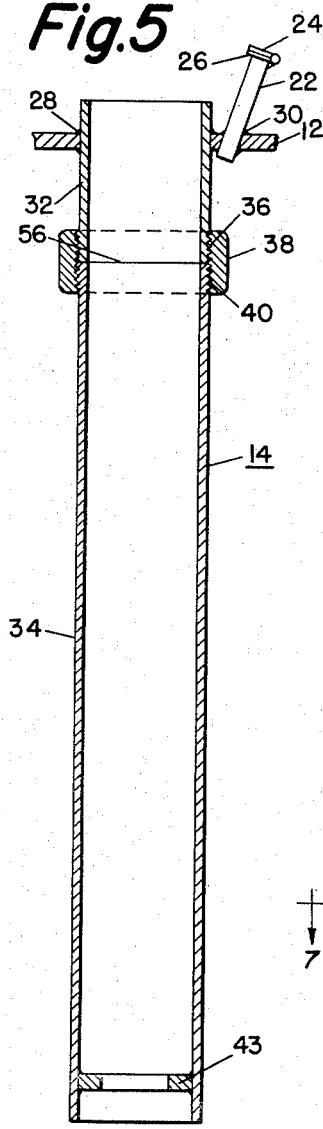
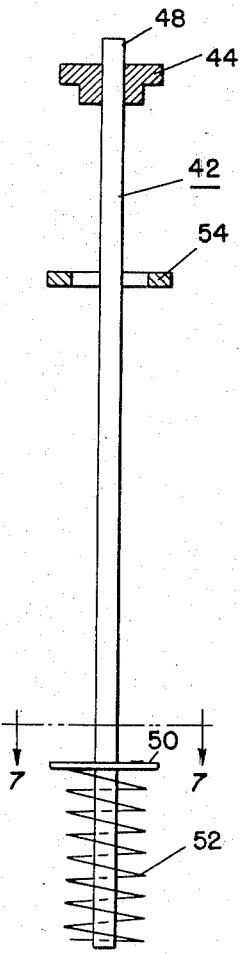
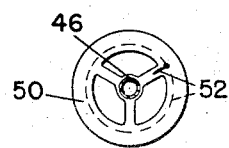
INVENTOR.
HAROLD A. QUIST
BY
*Busser and Harding*
ATTORNEYS Patented Sept. 1, 1953

2,650,499

UNITED STATES PATENT OFFICE 2,650,499

SAMPLING ADAPTER FOR RECEPTACLES

Harold A. Quist, Elkton, Md., assignor to Sun Oil Company, Philadelphia, Pa., a corporation of New Jersey Application March 27, 1950, Serial No. 152,036

4 Claims. (Cl. 73—425.4)

This invention relates generally to liquid samplers and more particularly to a sampling device adapted to be used, interchangeably, in containers with which it is designed to cooperate.

The necessity for sampling liquids in the petroleum and chemical industries is well known, and has given rise to many devices adapted for submergence in large bodies of liquid. It is common practice to submerge a receptacle with which more or less complicated valve mechanisms cooperate to obtain either a "simple" sample, as at one level, or a "composite" sample which is selected from various strata of the liquid volume during one sampling operation.

The earliest forms of devices used for this purpose comprised simply a weighted receptacle from which the stopper could be removed after the device had been submerged to the desired level in the liquid. If the receptacle were held at the selected level until filled with the liquid, a simple sample was obtained. If the device were moved slowly upward after the stopper had been removed, it was considered that a composite sample was obtained because the entering liquid was taken from different elevations within the body of the fluid. It will be readily understood that, due to the air contained within the receptacle which must be displaced through the liquid inlet opening in these early devices, the rapidity with which the initial liquid sample entered the container, and the variations in pressure as the receptacle was moved upward through the liquid, the results were seldom, if ever, those desired. It is an object of this invention to provide a sampling device which permits the entrance of liquid into the sampling receptacle unobstructed by entrapped air, yet secures both simple and composite samples.

The prior art shows devices ranging from simple stoppered containers to complex mechanisms involving valves operated by motors which graduates the opening in the receptacle and thus controls the beginning and period of the sampling operation. Such devices are self-contained including a specially constructed housing in which the valve or sampling control mechanism is permanently mounted. The task of taking a number of samples for laboratory or sales purposes requires the added labor of transferring the sample from the sampling device to separate containers and the possibility of chemical change due to aeration. It is a further object of this invention to provide an adapter, interchangeable with standard or uniformly designed receptacles for either simple or composite samples which greatly reduces the labor of sampling, and insures a true sample.

Receptacles having closures or stoppers of uniform size and shape so as to be interchangeable, such as for example the standard one gallon tin commonly used for turpentine, wood spirits or other commercial products well known on the market, are readily adapted for use with the disclosed adapter. The closure cap of such commercial containers is modified to hold a liquid inlet tube sealed in place through which the liquid to be sampled is conducted to a point near the bottom of the container. A separate air vent tube is used in conjunction with the liquid inlet tube to permit free flow of the sample into the container and is designed to release the entrapped air but not admit liquid. A stoppering arrangement is used to keep the liquid inlet tube sealed until the desired level in the body of the liquid is reached at which the sample is to be taken or started depending upon the type of sample desired.

The tube and cap device described is readily used in any container which the closure will fit in sealing engagement and may be used in succession in a number of these containers for repeated sampling if it is desired to obtain such samples for commercial purposes or to procure several samples for laboratory tests. An insert operating on the piston principle, designed to fit within the inlet tube, is used to control the flow of the liquid where a composite sample is required. By delaying the quantity of liquid which may enter the inlet tube at the initial opening stage and permitting the piston operation to enlarge the inlet at predetermined elevations of the liquid sample, the initial rapid flow into the container is controlled and sufficient space assured for further liquid to be added as a continuing sample as the device is withdrawn upwardly from the liquid body.

The complete structure and the method of operation will be more fully understood by the following detailed description with reference to the drawings in which:

Figure 1 is an elevation of a receptacle with the adapter in place.

Figure 2 is a sectional elevation of Figure 1 showing one stage of operation.

Figure 3 is a sectional elevation of Figure 1 showing a second stage in the operation.

Figure 4 is a sectional view of the adapter with the composite flow control insert in place.

Figure 5 is a sectional view of the adapter for simple sampling.

Figure 6 is a sectional view of the insert.

Figure 7 is a plan view of an element of Figure 6.

Referring to the various figures of the drawing wherein like numerals of reference designate similar parts in each of the figures, the numeral 10 designates one of a number of standard or uniformly constructed receptacles with which the common cap or closure 12 fits, interchangeably, in sealing engagement. A tube 14 passes through and is sealed in the cap 12, projecting above the upper surface thereof and extending downwardly into the receptacle to a point near the bottom so as to conduct the incoming liquid below the entrapped air inside the receptacle. A removable stopper 16, controlled by a weighted lowering line 18, connected by an extension 19 of the lowering line to the handle 20 and thereby attached to the receptacle or container 10, keeps the liquid sample from entering the container until removed by the operator. An air vent, shown here as tube 22, mounted adjacent the inlet tube 14 in the cap 12 and sealed therein in like fashion as 14 to prevent the inward seepage of liquid, is covered by flap 24. On the underside of the flap and positioned to contact the upper end of the air vent tube 22, a seal 26, made of such material as neoprene for use in sampling petroleum or of any other resilient material resistant to the effects of the liquid to be sampled, is cemented or otherwise affixed.

Referring now to the detailed structure of the adapter as shown in Figures 4, 5 and 6, as contrasted with the positioning of an adapter in a receptacle illustrated in Figures 1, 2 and 3 as described above, the liquid inlet tube 14 and the air vent tube 22 are shown permanently fixed to the cap 12 as by the soldered or welded joints 28 and 30 for the two tubes respectively. Below the cap, and within the container when the adapter is in place, the tube 14 is separated into an upper section 32 and lower section 34. The upper section 32 is threaded as at 36 and a socket 38 mounted on the threaded portion. The lower section 34 is threaded as at 40 on the upper end to engage the threads in the socket 38 and permit separation at this point for installing the insert generally designated as 42. An internal flange 43 is permanently connected within the lower section 34 adjacent the bottom to support the insert 42 in operating position. This structure represents the adapter as it is used to obtain simple samples from one level in the stored liquid.

To convert the device for procuring composite samples which are accurately representative of a selected depth of the liquid body the insert 42 is placed within the liquid inlet tube 14 described above. This insert 42 includes a valve plug 44 mounted on a tubular valve stem 46 which extends upwardly through the piston head as at 48 and downwardly through a spider 50 to which the tubular valve stem 46 is attached. A resilient member 52 such as a spring abuts the internal flange 43 in the lower tube section 34 of the inlet tube 14 and is fastened to the spider 50. The insert 42 is shown in detail in Figure 6 including a removable flange member 54 which is constructed to fit into the joint 56 between the upper section 32 and the lower section 34 of the inlet tube 14 and within the threaded socket 38, thereby acting as a contact surface for the valve plug 44 and a restriction to the liquid flow, the purpose of which will be more fully understood in considering the operation of the device.

In considering the operation it will be necessary to refer to all the figures which are shown in the drawings. With the exception of Figures 1 and 5, the remaining views disclose the adapter assembled for use in taking composite samples, for which the addition of the insert 42 is preferred. Considering that in Figure 1 the adapter is without the insert 42, as shown in Figure 5, and represents the form of the device to be used for the purpose of obtaining a simple sample, these figures will be discussed first in that relation.

As defined above, a "simple" sample is that which is taken from one level of the liquid bulk and therefore requires that the sampling device be sealed until the predetermined elevation is reached by the submerged receptacle and, further, that the entire sample be taken at this predetermined level. To obtain this end, the adapter as shown in Figure 5 is inserted in a container 10 and fastened securely in sealing engagement by the cap 12, as shown in Figure 1. The flap 24 of the air vent 22 is closed to prevent liquid from entering the tube 22 during the downward movement. The assembled device is shown in Figure 1 as it would appear before being submerged in the body of the liquid and to be held suspended at the proper elevation by the weighted lowering line 18. This requires that the stopper 16 be firmly inserted in the liquid inlet tube 14 before the device is lowered to insure no liquid entering the receptacle until desired by the operator. The slack end 19 of the weighted lowering line 18 is attached to the container 10 by tying or clipping to the handle 20 or other securing means thereon. When submerged to the proper elevation in the liquid, a jerk of the lowering line 18 releases the stopper and suspends the receptacle by the slack end 19 and lowering line 18 with the inlet tube 14 open to the entrance of the liquid. The liquid then flows downwardly through the inlet tube 14 and out the bottom of the tube adjacent the bottom of the receptacle. It may be calculated that the receptacle will be filled to approximately two-thirds of its volume before a point of equilibrium will be reached where the pressure differential between the top of the air vent 22 and the level of liquid therein causes the air vent flap 24 to open. In this way the entrapped air within the receptacle is forced upwardly and out through the air vent tube 22, lifting the flap 24 and bubbling upward through the liquid bulk as illustrated in Figure 3 for the composite sample operation. In contrast with present devices of this type, the liquid is thus enabled to fill the entire receptacle by forcing all the air from a vent separate from the inlet. In existing devices a single tube for the inlet of the liquid and the outlet of the air prevents complete exhaustion of the air and consequent filling of the receptacle. Another objection to the form of existing device is the aeration of the sample by the air in the receptacle being forced through it in the common passage.

The flap 24 may be provided with a stop to prevent it from lifting upwardly beyond the vertical position, thereby assuring the return of the flap to sealing contact with the end of tube 22 under the action of the liquid as the receptacle is pulled upwardly in the liquid. As the tube is small in cross-section, however, compared with the volume of the container, and as the receptacle is now substantially filled with liquid, any additional liquid entering from other elevations within the liquid bulk will not appreciably affect the characteristics of the simple sample.

A composite sample can be obtained by using the device already described but it is preferred to use the insert 42 in the liquid inlet tube of the simple sampling device. This is placed by separating the liquid inlet tube 14 into the upper section 32 and the lower section 34 and placing the insert 42 in the lower section 34 so that the resilient member 52 abuts the lower flange 43 and the spider 50 centers the tubular valve stem 46 therein. The washer flange 54 is inserted in the threaded sleeve 38 and clamped by the lower section 34 being screwed into the lower end of the sleeve. When the upper and lower sections are reassembled the device appears as shown in section in Figure 4. With the insert 42 in place the resilient member or spring 52, being a compression member, forces the valve plug 44 upward away from the flange 54 and tends to hold it in a normally open position. The adapter is then attached to a receptacle 10, fastened in place by engaging the cap 12 with the receptacle and otherwise prepared for lowering into the body of liquid by firmly inserting the stopper as has already been discussed in taking a simple sample. At a selected depth in the liquid the stopper 16 is removed by jerking the lowering line 18 and the receptacle hangs suspended from the slack end 19 attached on one end to the receptacle and the other to the stopper, all connected to the weighted line 18. The incoming liquid forces the valve plug 44 downwardly to rest on the washer flange 54 against the upward thrust of the resilient member 52, thereby obstructing the flow of liquid through the opening in flange 54. With this entrance sealed, the liquid enters the receptacle by passing down the hollow valve stem 46 which is of restricted diameter and permits only a limited quantity to be admitted. As the liquid flows downwardly through the hollow valve stem 46 to the bottom of the receptacle as shown in Figures 2 and 3, the flow of the sample at the starting level is controlled.

At this point in the operation, the internal pressure in the receptacle is that of the atmosphere confined therein at the beginning of the sampling operation. The external pressure is greater than the internal pressure by the depth and density of the liquid in which it is submerged. Consequently, the valve plug 44 is forced downwardly against the upward thrust of the resilient member 52 to rest firmly on the flange 54. In addition, the flap 24 is pressed firmly against the end of the air vent tube 22 by the pressure differential. As the liquid rises slowly, admitted only by the hollow valve stem 46, the air is compressed in the upper part of the receptacle until equilibrium of the external and internal pressures is approached illustrated by Figure 2. During the approach to equilibrium the resilient member, being relieved gradually of the pressure difference, begins to assume its normally expanded condition and raises the valve plug 44 to admit the liquid more rapidly. This action continues until the entrapped air in the receptacle unbalances the external pressure on the flap 24 of the air vent, and the air escapes permitting more liquid to enter as in Figure 3, until the receptacle is filled by the sample.

It will be noted that the operation of the device, either with or without the insert, is controlled by the relative pressures, internal and external, which permits the entrance of the sample into the receptacle at a regulated rate. Thus, the liquid surrounding the sampler remains unagitated and gives a true sample, either simple or composite. This is particularly advantageous in taking composite samples with the insert described above. As defined the composite sample is taken through a selected depth of the liquid requiring the upward movement of the sampler as the sample is taken. With the controlled admittance of the liquid balanced by pressures and the valve insert 42, the inrush of liquid at the beginning of the operation is avoided and room in the receptacle is saved to receive the latter samples from the liquid strata above the starting point.

It will be understood that the device disclosed here can be used with standard or especially designed receptacles or by means of a mechanically adjustable cap may be used with an assortment of containers as a sampling device. The interchangeability of the device from a simple sampling adapter to a composite sampling adapter is readily made and because of the small number of parts may be donee at will by the operator. It is therefore possible with this device to obtain an unlimited number of samples of the two desired types, simple or composite, without requiring different apparatus and transferring from the now known sampling devices to separate and distant containers.

The structure described here as a specific embodiment may be modified in many details and still be within the spirit of the invention. For example, the use of a stopper to seal the inlet tube in conjunction with a weighted lowering line represents a well known means for accomplishing this purpose and is readily replaceable by many forms of closure valves both well known and easily devised. This invention, therefore, is not to be restricted except insofar as is necessitated by the prior art and by the spirit of the appended claims.

I claim:

1. A combination adapter to convert receptacles into composite and simple liquid sampling devices comprising in combination a closure adapted to seal the receptacles, said closure being provided with an air vent opening thereinto, a liquid inlet tube adjacent the air vent positioned to extend through said closure in sealed engagement therewith and project into the receptacle to a point near the bottom thereof, said tube being separable into an upper and lower section below the closure and adjacent thereto; internal flanges at the top and bottom of said lower section of the inlet tube; a liquid flow retarding valve for obtaining composite samples removably insertable in said tube to cooperate with the upper flange therein, including a plug, a hollow stem extending the length of the lower section and through said plug; resilient means arranged to engage the lower flange normally holding the plug from contact with the upper flange; and stopper means to control the entrance of the liquid into the receptacle.

2. An adapter to convert receptacles into composite liquid sampling devices comprising, in combination with a closure for said receptacles, an upper tubular liquid inlet section extending through and in sealed engagement with said closure, and adapted to project downwardly into the receptacle; a threaded socket on the lower end of said upper tubular section; a lower tubular section constructed to engage the threaded socket of the upper section and extending to a point near the bottom of a receptacle; a removable flange insertable in the threaded socket between the tubular sections adapted to constrict the inner diameter of said tube; a fixed internal flange at the bottom of the lower tubular section; a valve plug within the upper tubular section constructed and arranged to operably engage the removable flange; a hollow valve stem extending upwardly through the plug and downwardly through the lower tubular section and the fixed internal flange; resilient means engaging the fixed flange normally holding the plug from contact with the removable flange; an air vent pipe in said closure adjacent the upper tubular extension; a hinged flap closure on the upper end of said air vent pipe; and means for opening the upper tubular section to receive the liquid sample at the selected depth in a liquid body.

3. An adapter to convert receptacles into liquid sampling devices comprising in combination, a common closure adapted to cooperate interchangeably with the receptacles in sealing engagement, a liquid inlet tube extending through the closure substantially to the bottom of said receptacles, an air vent tube opening into said common closure adjacent the liquid inlet tube, a flap cover externally hinged to said vent tube adjusted to normally close the same against the admission of liquid and a stopper frictionally closing said liquid inlet tube removable to start the sampling operation.

4. An adapter to convert receptacles into liquid sampling devices comprising in combination a closure for said receptacles; an air vent tube opening into said closure; a hinged cover positioned to normally close said air vent; a liquid inlet tube extending through said closure in sealed engagement therewith and projecting into the receptacle to a point near the bottom thereof; valve means in said liquid inlet tube including a plug, a hollow stem, resilient means to urge the plug into a normally open position, and a removable flange for insertion in the inlet tube to cooperate with the valve plug; and means to normally close said inlet tube until released within the liquid at the desired elevation.

HAROLD A. QUIST.

References Cited in the file of this patent

UNITED STATES PATENTS

| Number | Name | Date |
|--------|------|------|
| 540,121 | Tagliabue | May 28, 1895 |
| 2,040,701 | Marsden | May 12, 1936 |
| 2,294,655 | Einstein | Sept. 1, 1942 |
| 2,300,194 | Anderson | Oct. 27, 1947 |